United States Patent [19]
Hankinson

[11] Patent Number: 5,295,165
[45] Date of Patent: Mar. 15, 1994

[54] SELF-LOCKING PLUG FOR PLUGGING A HOLE DEFINED BY A SURROUNDING STRUCTURE

[75] Inventor: Michael F. Hankinson, Monroeville, Pa.

[73] Assignee: Westinghouse Electric Corp., Pittsburgh, Pa.

[21] Appl. No.: 23,015

[22] Filed: Feb. 25, 1993

[51] Int. Cl.⁵ .............................................. G21C 13/067
[52] U.S. Cl. ......................................... 376/203; 138/89
[58] Field of Search .................. 376/203, 204; 138/89, 138/96 R; 220/236, 315; 165/71

[56] References Cited

U.S. PATENT DOCUMENTS

| | | | |
|---|---|---|---|
| 4,591,068 | 5/1986 | Tolino et al. | 376/203 |
| 4,637,914 | 1/1987 | Boyle et al. | 376/352 |
| 4,693,389 | 9/1987 | Kalen | 376/203 |
| 4,817,671 | 4/1989 | Mathison et al. | 138/89 |

*Primary Examiner*—Daniel D. Wasil
*Attorney, Agent, or Firm*—Walter S. Stevens

[57] ABSTRACT

Self-locking plug for plugging a hole defined by a surrounding structure, which structure may be a nuclear power reactor pressure vessel core barrel flange. When the hole is plugged, transient hydraulic forces generated in the pressure vessel will tend to force the plug from the hole. The plug includes a plug body sized to be disposed in the hole and a locking member pivotally connected to the plug for locking the plug body to the flange, so that the plug is not inadvertently forced from the hole by the transient hydraulic forces. A cam, which is capable of engaging the locking mechanism for outwardly pivoting the locking mechanism, is slidably connected to the plug body. A movable piston is connected to the cam for driving the cam into engagement with the locking mechanism. Moreover, the locking mechanism pivots to engage the flange as the cam engages the locking member. A ram, which is also connected to the plug body, is provided to ram the plug body into the hole for snugly plugging the hole. In this manner, the plug is locked to the flange and resists being inadvertently dislodged from the hole, which may otherwise occur due to transient hydraulic forces generated in the pressure vessel during service operations to retrieve the detector.

2 Claims, 6 Drawing Sheets

SELF-LOCKING PLUG FOR PLUGGING A HOLE DEFINED BY A SURROUNDING STRUCTURE

BACKGROUND

This invention generally relates to hole plugs and more particularly relates to a self-locking plug for plugging a hole defined by a surrounding structure, which structure may be a nuclear power reactor pressure vessel core barrel flange.

Although hole plugs are known in the prior art, it has been observed that prior art plugs have certain operational problems associated with them which make these plugs unsuitable for plugging a hole formed through a nuclear reactor pressure vessel core barrel flange. However, before these problems can be appreciated, some background is necessary as to the structure and operation of a typical nuclear power reactor and its associated core barrel flange.

In this regard, a nuclear power reactor is a device for producing heat by controlled fission of fissionable material contained in fuel assemblies. A plurality of the fuel assemblies are grouped in a sealed reactor pressure vessel to define a nuclear reactor core therein. Pressurized liquid moderator coolant is caused to circulate through the pressure vessel and over the fuel assemblies for assisting in the fission process and for removing the heat produced by fission of the fissionable material contained in the fuel assemblies.

Disposed inwardly of the pressure vessel is a core barrel for supporting the fuel assemblies thereon, the pressure vessel and the core barrel defining an annular space therebetween. The core barrel has a core barrel flange for connecting it to the inside of the pressure vessel so that the core barrel is supported by the pressure vessel. The core barrel flange has an access hole therethrough for providing access to a radiation detector disposed in the space between the core barrel and the pressure vessel. The radiation detector is typically a neutron detector or activation foil for measuring the integrated neutron flux seen by the pressure vessel. It is important to measure this integrated neutron flux in order to determine the margin remaining to the maximum allowable integrated neutron flux, also known as the "nil ductility temperature" limit, which has safety significance. Mounted atop the core barrel is an upper support structure for supporting reactor internal components. Although the access hole is open during reactor service operations to retrieve the radiation detector therethrough, the hole is closed during normal reactor operation so that the coolant does not flow through it. It is desirable not to have the coolant flow through the hole during normal reactor operation because coolant that flows through the hole bypasses the core and is therefore unavailable for cooling the core. It is desirable to adequately cool the core to avoid damage to the fuel assemblies.

In order to prevent bypass flow through the hole defined by the core barrel flange, a prior art plug has been inserted into the hole to plug the hole. During normal reactor operation the upper support structure bears against this plug to maintain the plug in the hole. However, in order to retrieve the detector during reactor service operations, the upper support structure is removed to provide access to the core and detector. During detector retrieval operations that necessitate removal of the upper support structure, any coolant pump transients occurring at that time may be forceful enough to generate hydraulic forces that may cause the coolant to forcibly dislodge the prior art plug from the hole before it can be grasped and removed from the hole. That is, when the upper support structure is removed, the plug may become dislodged from the hole due to the transient hydraulic force of the coolant acting on the plug because the prior art plug is not secured or locked to the core barrel flange. Such inadvertent dislodgement of the plug from the hole prior to being grasped and controllably removed is undesirable because such a dislodged plug may become a "loose part" that may migrate in the coolant to damage fuel assemblies and other internal reactor components. Therefore, a problem in the art is to provide a plug for plugging a hole defined by a surrounding structure, such as a reactor pressure vessel core barrel flange, so that the plug is not inadvertently dislodged from the hole by upset hydraulic forces generated in the vessel.

Hole plugs suitable for use in nuclear reactor pressure vessels are known. A plug for altering the flow of coolant in a nuclear reactor is disclosed in commonly owned U.S. Pat. No. 4,591,068 titled "Core Barrel Plug" issued May 27, 1986 in the name of Ralph W. Tolino, et al. This patent discloses a core barrel plug capable of being remotely installed in a port of a core barrel of a pressurized water nuclear reactor for converting the reactor from a by-pass downflow configuration to a by-pass upflow configuration. The plug comprises a body having an expandable cylindrical portion with a movable mandrel disposed in the body. Remote fluid pressurization causes the mandrel to be advanced thus expanding the body into contact with the port. The plug also comprises a locking mechanism to prevent inadvertent release of the plug. Although the Tolino, et al. patent discloses a core barrel plug comprising a locking mechanism to prevent inadvertent release of the plug, this patent does not appear to disclose a self-locking plug for plugging a hole defined by a surrounding structure, as described and claimed hereinbelow.

Therefore, what is needed is a self-locking plug for plugging a hole defined by a surrounding structure, which structure may be a nuclear power reactor pressure vessel core barrel flange.

SUMMARY

Disclosed herein is a self-locking plug for plugging a hole defined by a surrounding structure, which structure may be a nuclear power reactor pressure vessel core barrel flange. The hole is typically open during reactor service operations to retrieve a neutron radiation detector or activation foil disposed in the pressure vessel, but is typically plugged at other times in order to prevent coolant from flowing through the hole and bypassing the reactor core. However, transient hydraulic forces generated in the pressure vessel will tend to force the plug from the hole. Therefore, according to the invention, a self-locking plug is provided that is capable of being locked to the core barrel flange as it plugs the hole, so that the plug is not susceptible to being inadvertently dislodged from the hole even when acted upon by transient hydraulic forces. The plug includes a plug body sized to be disposed in the hole and a locking member pivotally connected to the plug body for locking the plug body to the flange. A cam, which is capable of engaging the locking mechanism for outwardly pivoting the locking mechanism, is slidably connected to the plug body. A movable piston is connected to the cam for sliding the cam into engagement with the locking mechanism. The locking mechanism pivots to engage the flange as the cam slides to engage the locking member. Moreover, a ram, which is also connected to the plug body, is provided to ram the plug body into the hole for snugly plugging the hole. In this manner, the plug is locked to the flange and resists being dislodged from the hole, which may otherwise occur due to transient hydraulic forces generated in the pressure vessel.

In its broad form, the invention is a self-locking plug for plugging a hole defined by a surrounding structure, comprising a plug body adapted to be disposed in the hole; locking means connected to said plug body for locking said plug body to the structure; camming means connected to said plug body for moving said locking means; actuator means connected to said camming means for actuating said camming means; and ramming means connected to said plug body for ramming said plug body into the hole.

An object of the present invention is to provide a self-locking plug for plugging a hole defined by a sure rounding structure, which structure may be a nuclear power reactor pressure vessel core barrel flange.

A feature of the present invention is the provision of a plug body adapted to be disposed in the hole and movable locking means connected to the plug body for locking the plug body to the structure.

Another feature of the present invention is the provision of camming means connected to the plug body for moving the locking means.

Yet another feature of the present invention is the provision of ramming means connected to the plug body for ramming the plug body into the hole.

An advantage of the present invention is that the plug resists being inadvertently dislodged from the hole due to upset hydraulic forces generated in the pressure vessel because the plug is locked to the structure.

Another advantage of the present invention is that the reactor coolant does not substantially flow through the hole to bypass the core when the plug plugs the hole.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENTS

Disclosed hereinbelow is a self-locking plug for plugging a hole defined by a surrounding structure, which structure may be a nuclear power reactor pressure vessel core barrel flange. The core barrel flange has an access hole transversely therethrough for providing access to a neutron radiation detector or activation foil disposed in an annular space defined between the core barrel and a surrounding pressure vessel shell. The plug closes the hole when access to the detector is not required in order to prevent the coolant from flowing through the hole and bypassing a reactor core disposed in the pressure vessel shell. However, the plug is removed from the hole when access to the radiation detector is desired. In this regard, when access to the detector is desired, an upper support structure, which is mounted atop the core barrel, is removed. When the upper support structure is removed, transient hydraulic forces that may occur in the pressure vessel will tend to dislodge the plug from the hole prior to it being grasped and controllably removed. Such inadvertent dislodgement of the plug from the hole prior to being grasped and controllably removed is undesirable because such a plug may become a "loose part" that may migrate in the coolant to damage fuel assemblies and other internal reactor components. Therefore, a problem in the art is to provide a plug that is resistant to being inadvertently dislodged even in the presence of such transient hydraulic forces and that is readily controllably removed when access to the detector is desired. According to the invention, this problem is solved by providing a self-locking plug that is resistant to begin inadvertently dislodged and that is also readily controllably removed to access the radiation detector.

However, before describing the subject matter of the present invention, it is instructive first to briefly describe the structure and operation of a typical nuclear power reactor and its associated core barrel flange.

Figure 1:
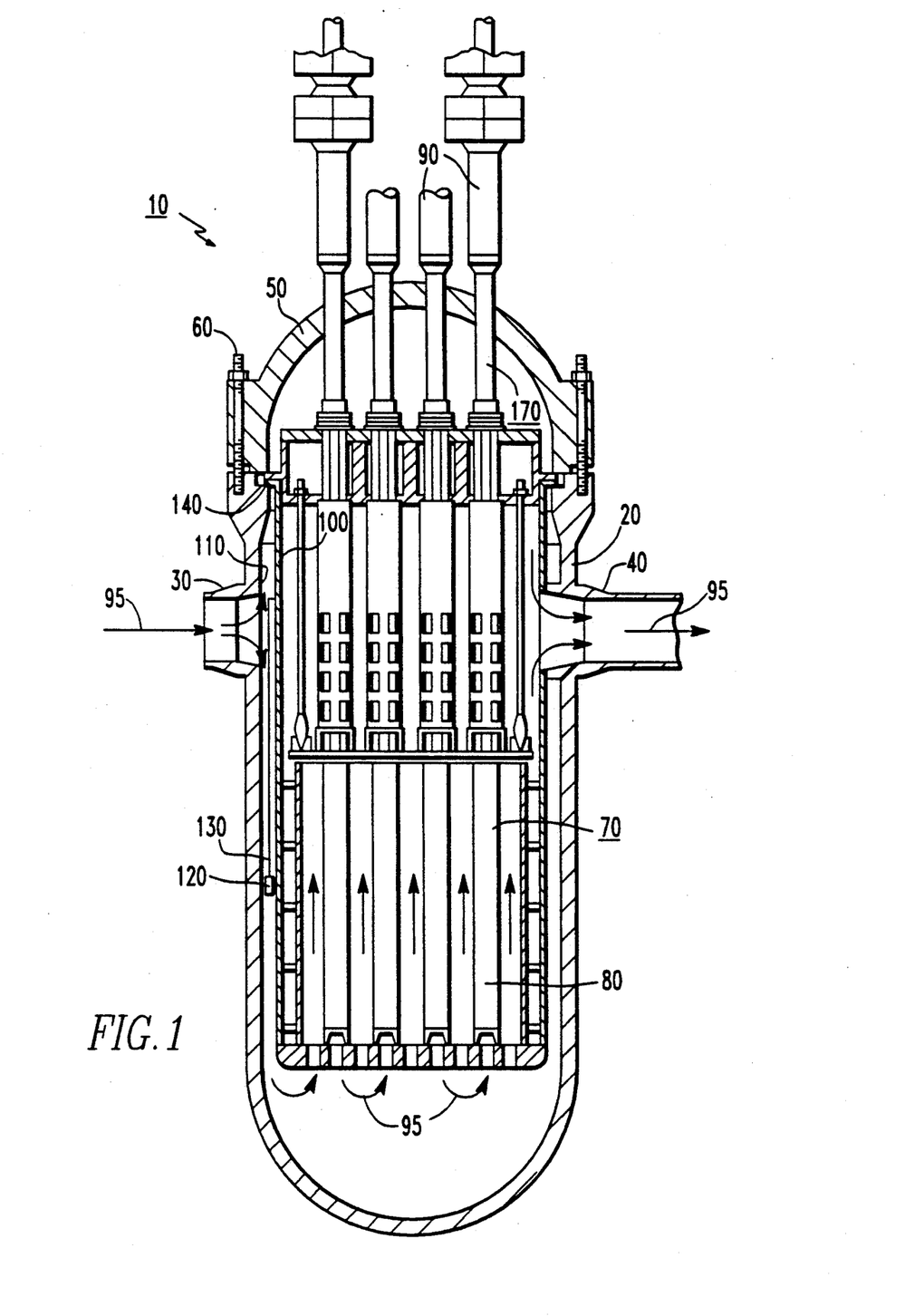
FIG. 1 shows in partial vertical section, the interior of a typical nuclear power reactor pressure vessel with parts removed for clarity, the vessel having a core barrel disposed therein and an upper internals support structure mounted atop the core barrel.

Therefore, referring to FIG. 1, there is shown a typical nuclear power reactor, generally referred to as 10, for producing heat by controlled fission of fissionable material (not shown). Reactor 10 includes a vertically-oriented and generally cylindrical reactor pressure vessel shell 20 open at its top end and having a plurality of inlet nozzles 30 and outlet nozzles 40 attached to the upper portion thereof (only one of each nozzle is shown). A generally hemispherical reactor vessel closure head 40 is mounted atop vessel shell 20 and is sealingly attached to the open top end of vessel shell 20, such as by a plurality of hold-down bolts 60, so that closure head 50 sealingly caps vessel shell 20. Capping vessel shell 20 in this manner allows for suitable pressurization of the coolant (not shown) circulating through vessel shell 20 as reactor 10 operates. The coolant may be borated demineralized water maintained at a relatively high pressure of approximately 2500 psia and circulated at an average velocity of approximately 30 feet per second.

Still referring to FIG. 1, disposed in reactor 10 is a nuclear reactor core, generally referred to as 70, comprising a plurality of nuclear fuel assemblies 80 containing the fissionable material. Extending through the top of closure head 50 are a plurality of control rod drive mechanisms (CRDMs) 90 having control rod clusters (not shown) connected thereto. The control rod clusters extend into their respective fuel assemblies 80 for controlling the fission process in reactor core 70.

As reactor 10 operates, the coolant enters vessel shell 20 by means of inlet nozzle 30 and circulates therethrough generally in the direction of arrows 95. As the coolant circulates through vessel shell 20, it also circulates over fuel assemblies 80 for assisting in the fission process and for removing the heat produced by fission of the fissionable material contained in fuel assemblies 80. After circulating through vessel shell 20, the coolant leaves vessel shell 20 by means of outlet nozzle 40. The heat carried by the coolant exiting outlet nozzle 40 is ultimately transferred to a turbine-generator for producing electricity in a manner well known in the art of electricity production from nuclear power.

Figures 2, 4:
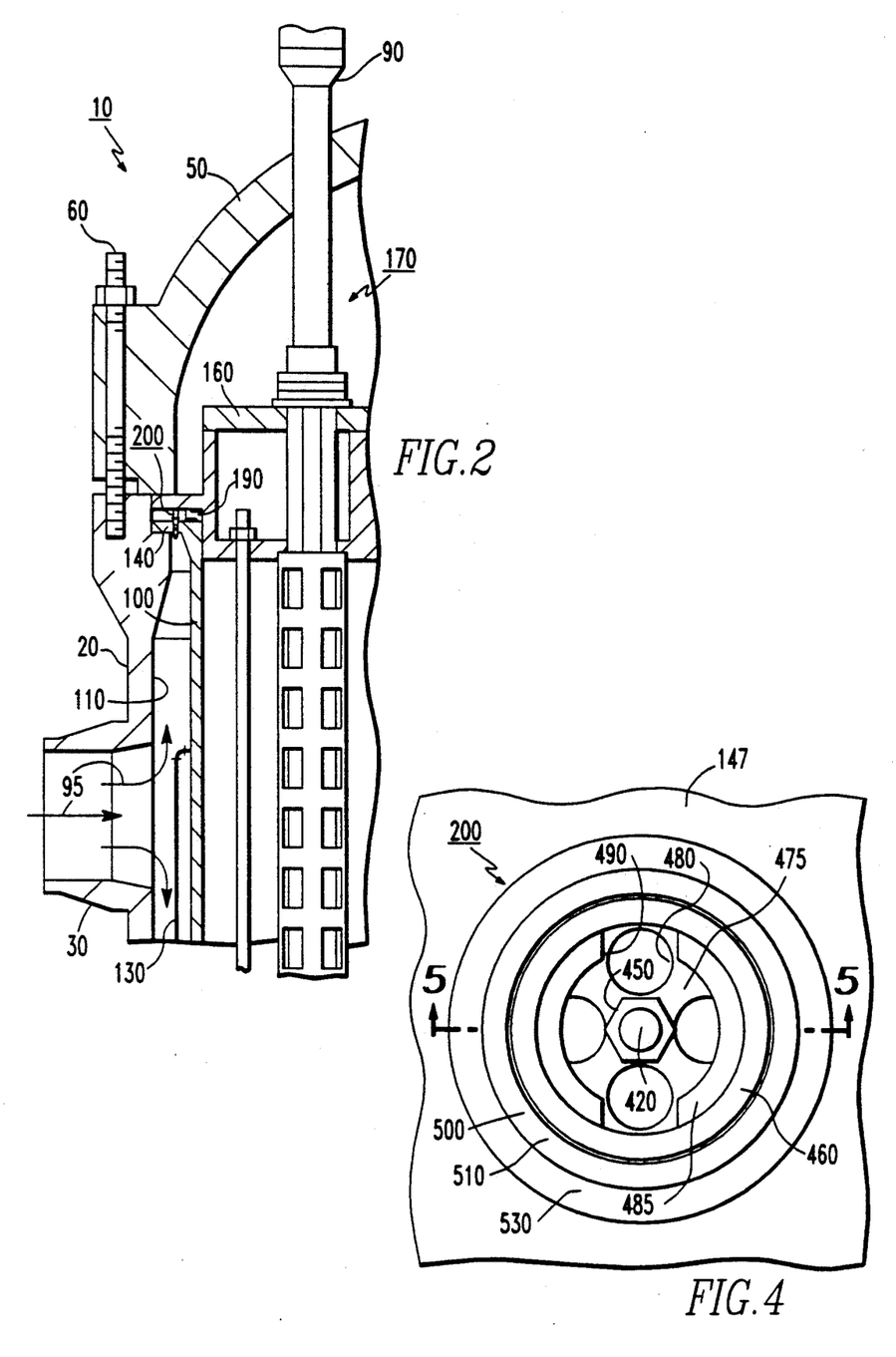
FIG. 2 is a fragmentation view in partial vertical section of the interior of the pressure vessel.
FIG. 4 is a view taken along section line 4—4 of FIG. 3.
Figure 3:
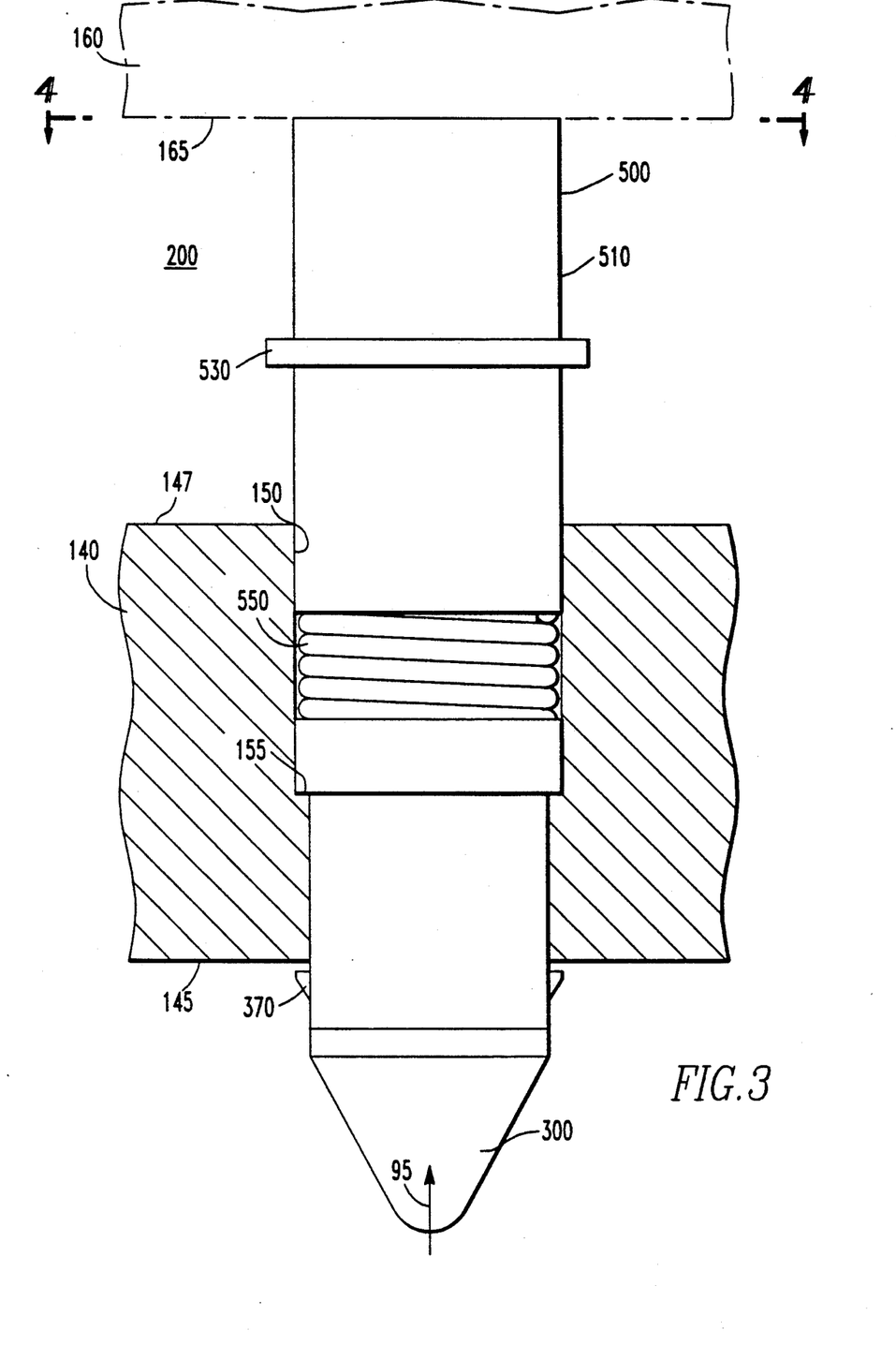
FIG. 3 is a view in elevation of a self-locking plug disposed in a hole defined by the core barrel, the plug being shown in the locked position.
Figure 5:
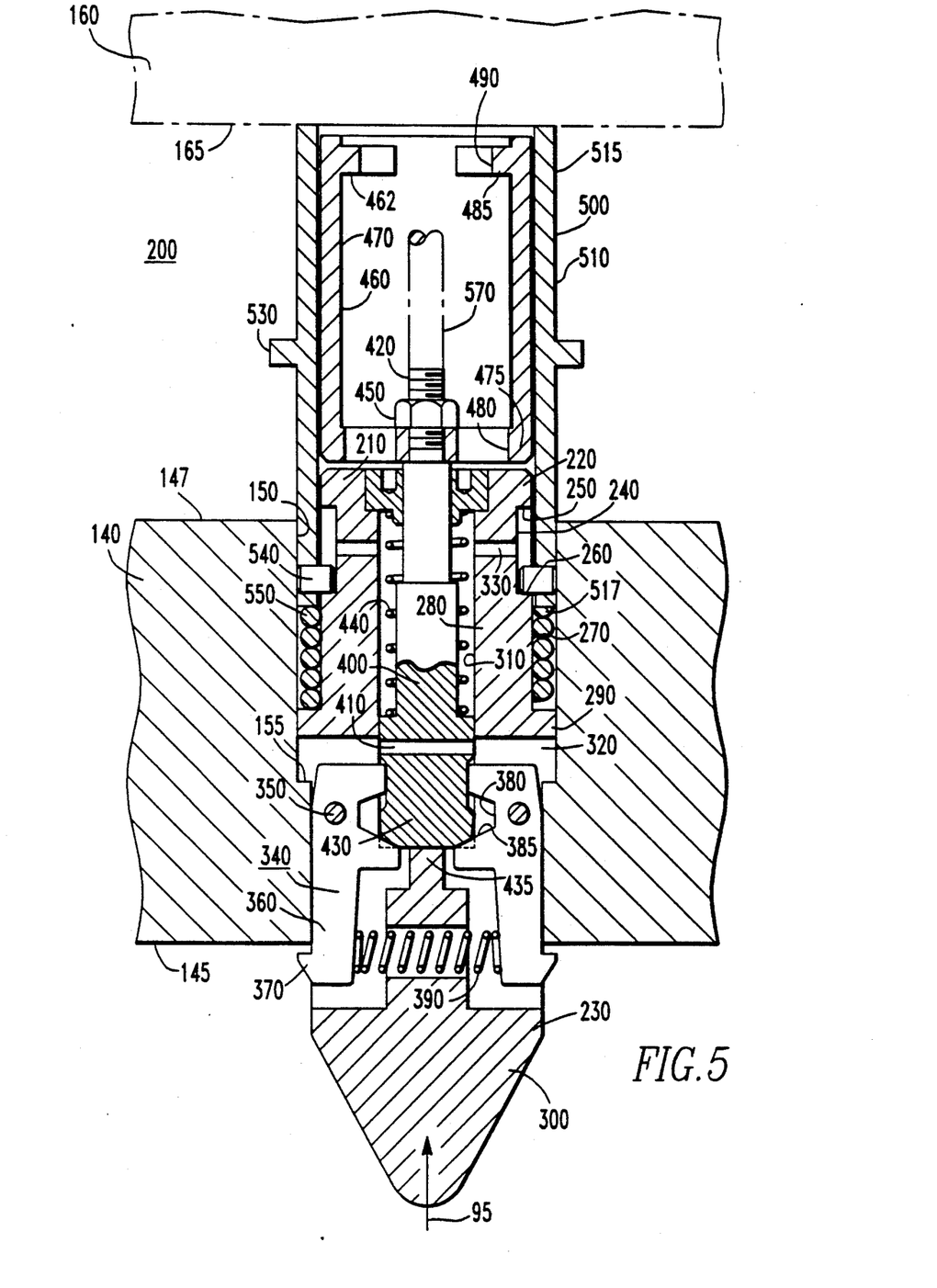
FIG. 5 is a view taken along section line 5—5 of FIG. 4 showing the plug in the locked position.

Referring to FIGS. 1, 2, and 3, a generally cylindrical core barrel 100 is concentrically disposed in vessel shell 20 for supporting fuel assemblies 80 thereon. Vessel shell 20 and core barrel 100 define an annular space 110 therebetween. Disposed in space 110 and adjacent vessel shell 20 is at least one retrievable radiation sensitive detector 120, which may be a neutron radiation detector or activation foil, connected to core barrel 100 such as by bracket 130. Radiation detector 120 is sensitive to the neutron flux penetrating vessel shell 20, which neutron flux is produced by operation of reactor core 70. Core barrel 100 has an integrally attached core barrel flange 140 extending therearound for connecting core barrel 100 to vessel shell 20. Flange 140 has an undersurface 145 and a top surface 147. Formed through flange 140 is at least one access port or hole 150 generally aligned with detector 120 for providing access to detector 120. Hole 150 may be a counter-bore or step bore having a first diameter and also having a second diameter less than the first diameter. The first diameter and second diameter define an annular depending shoulder or land 155 at the interface thereof. Allowing access to the radiation detector 120 allows it to be retrieved for analysis in order to determine the integrated neutron flux seen by vessel shell 20 during reactor operation.

Still referring to FIGS. 1, 2 and 3, spaced-apart but atop core barrel 100 and connected to vessel shell 20 is a generally cylindrical upper support structure 160 for supporting upper internal reactor components (e.g., CRDMs), which components are generally referred to as 170. Upper support structure 160 has a bottom surface 165 thereon. Thus, core barrel 100 and support structure 160 define a space 180 therebetween because core barrel 100 is spaced-apart from upper support structure 160. Disposed in space 180 and thus interposed between upper support structure 160 and core barrel 100 is a hold-down spring 190 having a generally S-shaped transverse cross section for exerting a downwardly biasing force on core barrel 100 and an equal but opposite upwardly biasing force on upper support structure 160. Thus, it will be appreciated from the description immediately hereinabove that hold-down spring 190 maintains core barrel 100 and upper support structure 160 in their predetermined spaced-apart relationship.

Referring to FIGS. 2, 3, 4 and 5, a self-locking plug, generally referred to as 200, is there shown for plugging hole 150 which is defined by its surrounding structure (i.e., core barrel flange 140). Plug 200 comprises a generally cylindrical plug body 210 having a distal end portion 220 and a proximal end portion 230. As used herein, the terminology "proximal end portion" means that end portion located nearer reactor core 70 and the terminology "distal end portion" means that end portion located further away from reactor core 70. Plug body 210 may be formed of a corrosion resistant material, such as "TYPE 304" stainless steel, for resisting the corrosive effects of the borated demineralized water coolant. In this regard, "TYPE 304" stainless steal comprises by weight percent approximately 0.08% carbon, 20% chromium, 11% nickel, and 78.92% iron. Distal end portion 220 of plug body 210 defines a circumferentially extending first groove 240 therein for reasons provided hereinbelow. The transverse contour of first groove 240 defines an upper stop 250 and a lower stop 260 for reasons disclosed more fully hereinbelow. Distal end portion 220 also defines a circumferentially extending second groove 270 therein for reasons provided hereinbelow. The innermost circumference of second groove 270 is larger than the innermost circumference of first groove 240 for defining an annular depending plug body shoulder 280 therebetween. Second groove 270 also defines a shelf 290 in plug body 210 for reasons provided hereinbelow. Moreover, proximal end portion 230 has an outermost diameter less than the outermost diameter of distal end portion 220. The outermost diameter of distal end portion 220 is sized so that is capable of being matingly disposed in the smaller diameter of hole 150 and so that the bottom of distal end portion 220 is capable of being seated on land 155. In addition, proximal end portion 230 includes an integrally attached cone-shaped nose 300 for allowing plug body 210 to be easily slidably inserted or guided into hole 150.

Still referring to FIGS. 2, 3, 4 and 5, distal end portion 220 defines a longitudinal bore 310 therein which terminates in a slot 320 formed transversely through proximal end portion 230. Thus, slot 320 is in communication with bore 310. Proximal end portion 220 also defines a channel 330 transversely therethrough for reasons disclosed hereinbelow. Moreover, connected to plug body 210 is locking means, such as a locking mechanism, generally referred to as 340, for locking plug body 210 to core barrel flange 140. In the preferred embodiment, locking mechanism 340 includes a plurality of parallel, spaced-apart and generally cylindrical pivot pins 350 outwardly projecting from plug body 210 in slot 320. A plurality of catches 360 are disposed in slot 320, each catch 360 being pivotally connected to a respective one of the pins 350. In the preferred embodiment of the invention, there are two catches 360. Each catch 360 includes an integral outwardly turned dog-leg shaped hook portion 370 at one end thereof for engaging undersurface 145 of flange 140. The other end of each catch 360 includes a contoured portion defining a cam surface 380 thereon for reasons provided hereinbelow. Cam surface 380, which may be a generally V-shaped notch, has a relatively steeply inclined (e.g., ten degrees with respect to vertical) portion 385 for reasons disclosed hereinbelow. Interposed between catches 360 is first biasing means, such as a first coiled spring 390 for outwardly biasing at least a portion of each catch 360, so that hook portions 370 are outwardly biased to align with undersurface 145 in order to engage undersurface 145. Spring 390 may be "INCONEL 600" comprising by weight percent approximately 76.0% nickel, 0.08% carbon, 0.5% magnesium, 8.0% iron, 0.008% sulfur, 0.25% copper, and 15.5% chromium for resisting the corrosive effects of the borated demineralized coolant.

Referring again to FIGS. 2, 3, 4 and 5, slidably extending through bore 310 and into slot 320 is camming means, such as an elongate cam 400 having a passageway 410 transversely therethrough for reasons disclosed hereinbelow. Cam 400 has a distal end portion 420 which may have external threads for reasons disclosed presently. Cam 400 also has a proximal end portion 430. Proximal end portion 430 defines an external surface of predetermined contour for slidably matingly engaging cam surface 380 belonging to catch 360. Interposed between catches 360 and coaxially aligned with cam 400 may be a center stop 435, center stop 435 being integrally formed with plug body 210. The purpose of center stop 435 is to limit or stop the downward travel of cam 400. Due to the predetermined position of center stop 435, cam 400 downwardly travels only to the extent necessary to fully engage cam surface 380 at which time proximal end portion 430 of cam 400 will abut center stop 435. Cam 400 includes second biasing means, such as a second coiled spring 440, surrounding elongate cam 400. Second coiled spring 440 may be "INCONEL 600" for resisting corrosion. Second coiled spring 400 is interposed between distal end portion 220 of plug body 210 and proximal end portion 430 of cam 400 to exert a downwardly biasing force for biasing proximal end portion 430 into engagement with cam surface 380. In the preferred embodiment, the compressive force required to fully compress second coiled spring 400 may be approximately 30 to 50 pounds for reasons provided hereinbelow. Connected to distal end portion 420 of cam 400, such as by an internally threaded nut 450 threadably engaging the external threads of distal end portion 420, is a generally cylindrical and hollow piston 460 for sliding or driving cam 400 into engagement with catches 360 in the manner provided hereinbelow. In this regard, piston 460 is capable of slidably translating cam 400 in bore 310 as cam 400 is driven into engagement with catches 360. Piston 460 may be "INCONEL 600" for resisting corrosion. More specifically, piston 460 defines an inner wall 470 therein and an integrally attached floor 475 at an end thereof, floor 475 having a plurality of orifices 480 transversely therethrough for reasons disclosed hereinbelow. Integrally attached to inner wall 470 and extending perpendicularly inwardly with respect thereto is a generally annular ring member 485 having a notch 490 for reasons disclosed more fully hereinbelow.

Referring yet again to FIGS. 2, 3, 4 and 5, connected to plug body 210 is ramming means, such as a ram 500, for ramming plug body 210 into hole 150. Ram 500 may be "INCONEL 600" for resisting corrosion. In the preferred embodiment, ram 500 is a generally cylindrical slide 510 having an inner wall 520 for slidably surrounding piston 460. Slide 510 also has a distal end portion 515 and a proximal end portion 517. Slide 510 may include a flange 530 integrally formed therewith and extending circumferentially therearound. It will be appreciated that flange 530 abuts top surface 147, which belongs to core barrel flange 140, when hole 150 is not counter-bored. Thus, one purpose for flange 530 is to prevent plug 200 from passing through hole 150 when hole 150 is a straight bore rather than a counter-bore. Another purpose of flange 530 is to allow plug 200 to be readily suspended in a bore (not shown) formed in a storage rack (not shown) for storing plug 200 when not in use. Slide 510 also includes a plurality of perpendicularly inwardly extending pegs 540 integrally attached to proximal end portion 517 for slidably engaging first groove 240. Thus, it will be appreciated from the description hereinabove that slide 510 is capable of downwardly slidably advancing and upwardly slidably retreating on plug body 210 because slide 510 slidably surrounds piston 470. It will also be appreciated from the description hereinabove that upper stop 250 is capable of stopping the upward retreat of pegs 540 for stopping the upward travel of slide 510 and that lower stop 260 is capable of stopping the downward travel of pegs 540 for stopping the downward travel of slide 510 as pegs 540 slidably engage first groove 240. Interposed between proximal end portion 280 and shelf 290 and surrounding second groove 270 is third biasing means, such as a third coiled spring 550, for biasing plug body 210 snugly into engagement with land 155. Third coiled spring 550 may be "INCONEL 600" for resisting corrosion.

Figure 6:
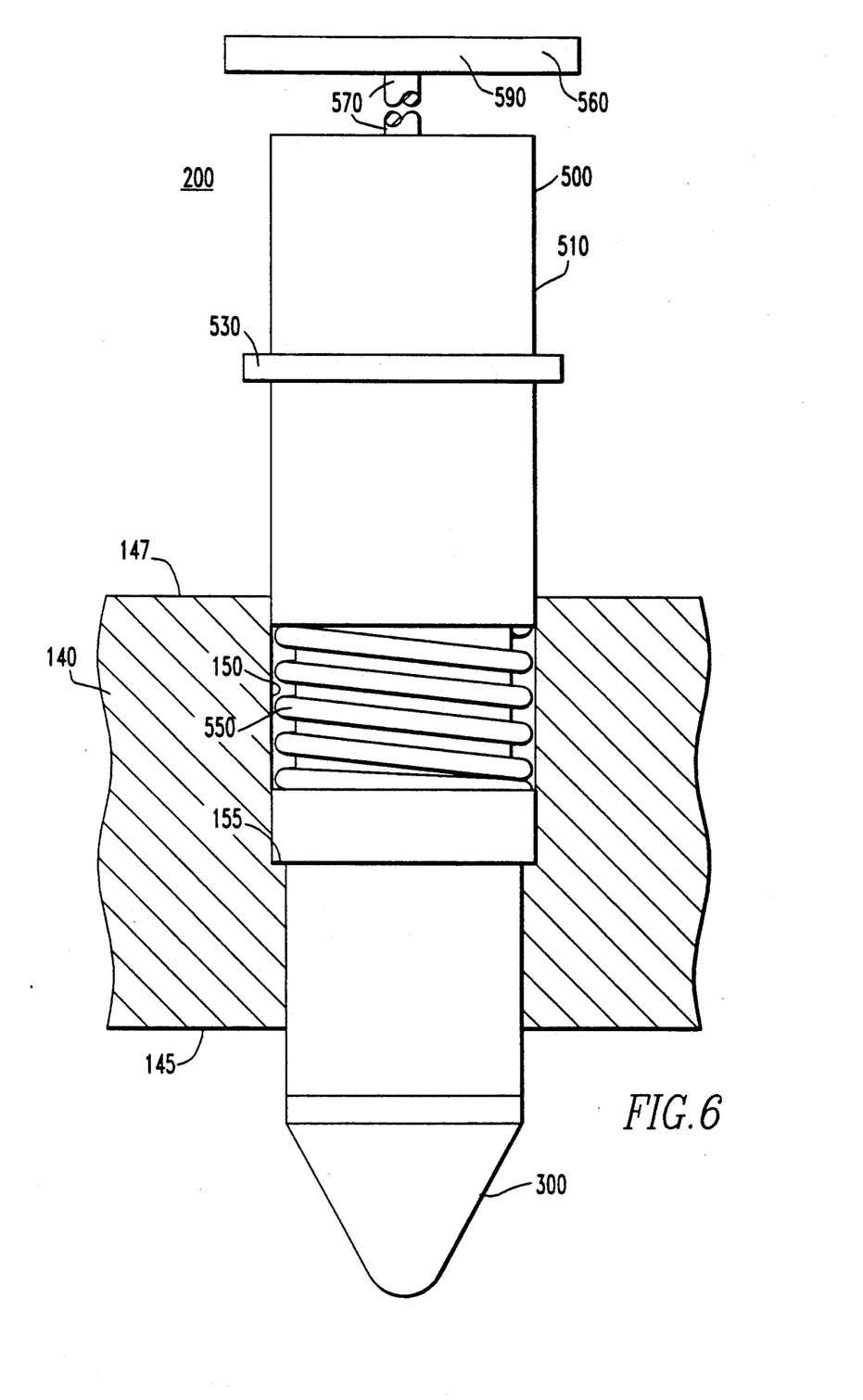
FIG. 6 is a view in elevation of the plug disposed in the hole, the plug being shown in the unlocked position and engaged by a plug installation and removal tool.
Figure 7:
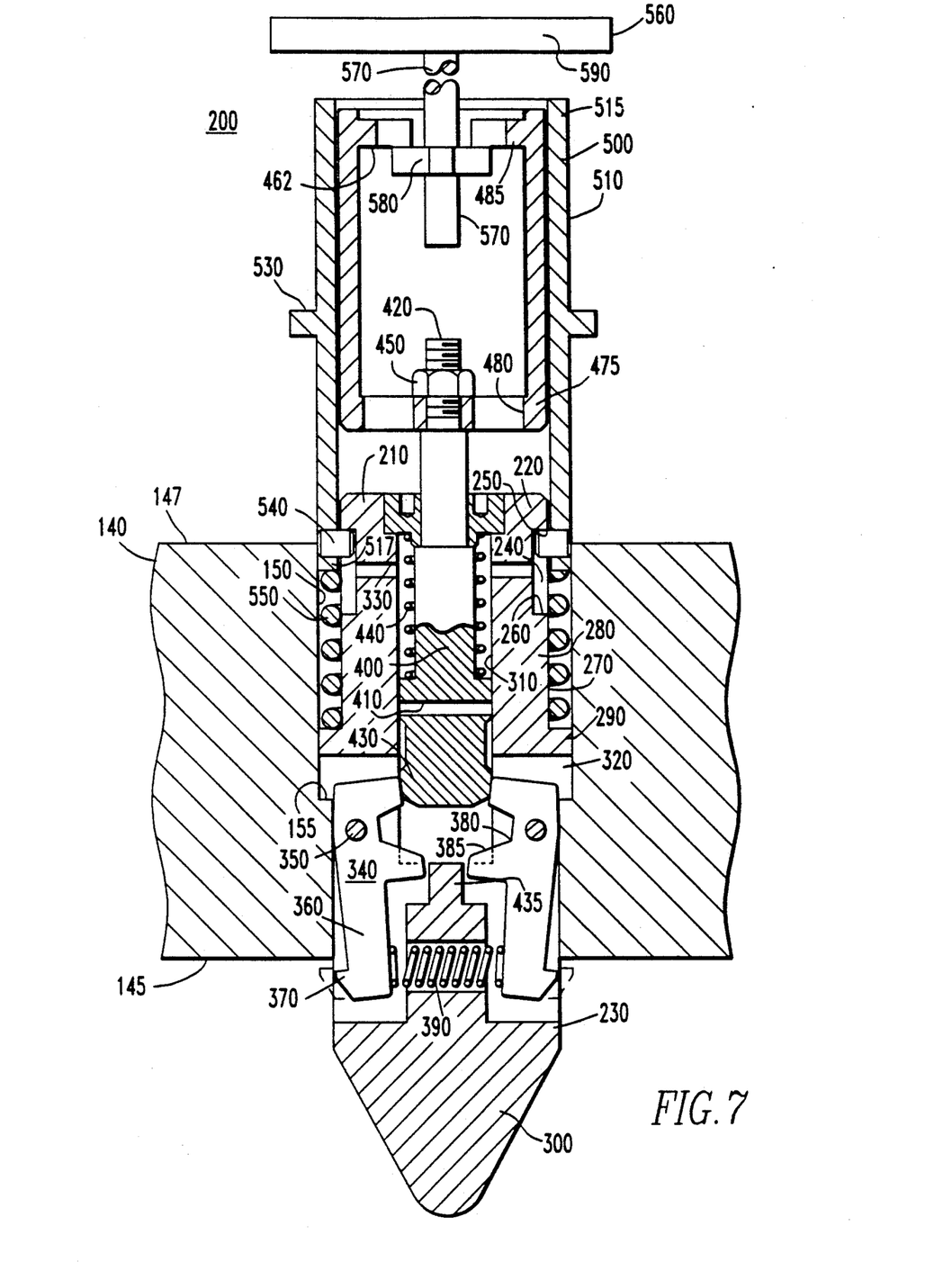
FIG. 7 is a view in vertical section of the plug, the plug being shown in the unlocked position and engaged by the plug installation and removal tool.

Turning now to FIGS. 6 and 7, plug 200 is shown in its unlocked position for insertion into hole 150 and for removal from hole 150. In this regard, a plug installation and removal tool 560 is provided for inserting and locking plug 200 in hole 150 and for unlocking and removing plug 200 from hole 150. Removal tool 560 may include an elongate shaft 570 having a plurality of perpendicularly outwardly extending and integrally attached wings 580 at one end thereof, wings 580 being sized to pass through notch 490. Integrally attached to the other end of shaft 570 is a handle 590 for rotating shaft 570 about its longitudinal axis. Wings 462 are capable of passing through notch 490, rotated by means of shaft 570. Wings 462 are then caused to abut the bottom surface of ring member 462 and then upwardly translated (by means of handle 560 and shaft 570) to upwardly translate piston 460 and cam 400 so that plug 200 is unlocked from flange 140 in the manner disclosed hereinbelow. Moreover, shaft 570 is capable of bearing against distal end portion 420 of cam 400 and its associated nut 450 to downwardly translate piston 460 and cam 400 for locking plug 200 to flange 140 in the manner disclosed hereinbelow. In this regard, shaft 570 is downwardly translated to bear against distal end portion 420 and nut 450 by downwardly pushing on handle 560.

OPERATION

Before plug 200 is installed in hole 150, hold-down bolts 60 and CRDMs 90 are removed in a customary manner well known in the art. Closure head 50 is then dismounted from vessel shell 20. Next, upper support structure 160 is dismounted from atop core barrel 100. Plug 200 is then remotely coaxially aligned with hole 150 and lowered therein. Plug 200 is coaxially aligned with hole 150 and lowered therein preferably by means of a suitable robotic device (not shown) rather than manually due to the relatively high radiation field emanating from reactor core 70.

When being inserted into hole 150, plug 200 is in its unlocked configuration as shown in FIGS. 6 and 7. Tool 560 is then coaxially aligned with piston 460 and downwardly translated, by means of handle 590, such that wings 580 pass unimpeded through notch 490. Tool 560 is further downwardly translated until the end of shaft 570 engages nut 450 and distal end portion 420 of cam 400. As shaft 570 engages nut 450 and distal end portion 420 to exert a downwardly-directed force thereon, piston 460 downwardly translates to downwardly slidably translate cam 400 in bore 310 until contoured proximal end portion 430 of cam 400 engages cam surface 380 belonging to each catch 360. The downward travel of cam 400 is limited or stopped by center stop 435. At the time when center stop 435 stops the downward travel of cam 400, proximal end portion 430 of cam 400 will have fully engaged cam surface 380. The force exerted by proximal end portion 430 against cam surface 380 causes at least a portion of each catch 360 to outwardly pivot about pivot pin 350 in a direction generally toward flange 140. As each catch 360 outwardly pivots, hook portion 370, which belongs to catch 360, is aligned with or disposed opposite undersurface 145 of flange 140. Moreover, once the contoured proximal end portion 430 of cam 400 suitably engages cam surface 380 in the manner described hereinabove, proximal end portion 430 will tend to resist disengagement from cam surface 380 due to the V-notch shape or contour of cam surface 380. In addition, it will be appreciated from the description hereinabove that the relatively shallow angle (approximately ten degrees) at the interface between proximal end portion 430 of cam 400 and inclined portion 385 of cam surface 380 assures that when catch 360 engages cam 400, the V-notch shape of cam surface 380 assists in sliding proximal end portion 430 downwardly as catch 360 pivots outwardly through slot 320. In addition, this feature of the invention assures that proximal end portion 430 suitably seats on inclined portion 385 of cam surface 380 to resist disengagement. Moreover, second coiled spring 440, which surrounds cam 400 and which is interposed between plug body 210 and cam 400, exerts a downwardly axially biasing force on cam 400 for providing additional assurance that proximal end portion 430 firmly seats on inclined portion 385 of surface 380 so that catches 360 remain in an outwardly locked position. In the preferred embodiment, this downwardly axially biasing force exerted by spring 440 on cam 400 may be approximately 200 pounds in order to firmly seat proximal end portion 430 on inclined portion 385 of surface 380. Moreover, first coiled spring 390, which is interposed between catches 360, exerts an outwardly radially biasing force against catches 360 for providing assurance that at least the hooked portion 370 of each catch 360 remains in an outwardly locked position until removal of plug 200 is desired. In this manner, plug 200 is locked to flange 140. Thus, it will be understood from the description hereinabove that plug 200 is self-locking. That is, once locked to flange 140, plug 200 remains in its locked position until removal is desired, as described in detail hereinbelow.

After plug 200 is locked to flange 140, in the manner described hereinabove, tool 560 is removed from piston 460 in substantially the reverse order of its insertion into piston 460. Next, upper support structure 160 is replaced atop core barrel 100 and hold-down spring 190 such that bottom surface 165 belonging to upper support structure 160 abuts hole-down spring 190 and distal end portion 515 of slide 510. As bottom surface 165 abuts distal end portion 517 of slide 510, slide 510 translates downwardly by a predetermined amount such that proximal end portion 515 of slide 510 compresses third coiled spring 550, which is disposed in second groove 270. In the preferred embodiment, the force required to fully compress third coiled spring 550 is approximately 30 to 50 pounds. As slide 510 downwardly translates, pegs 540 will downwardly translate to a like extent and slide in first groove 240 because pegs 540 are attached to slide 510. The downward translation of pegs 540, and thus the downward translation of slide 510, are stopped by lower stop 260. The force downwardly acting on slide 510 is transferred through third coiled spring 550 to shelf 290 because third coiled sprig 500 rests on shelf 290. As this force bears on shelf 290, it is transferred to plug body 210 for ramming plug body 210 snugly into hole 150 and into intimate engagement with land 155. Ramming plug body 210 into hole 150 in this manner provides assurance that plug 200 firmly seats on land 155. Moreover, as upper support structure 160 is mounted atop core barrel 100, it will exert a downwardly directed force of approximately 100,000 to 200,000 pounds against distal end portion 515 of slide 510 for maintaining plug 200 in hole 150 even as it is acted upon by upwardly directed hydraulic forces. Closure head 50, bolts 60 and CRDMs 90 are then replaced atop vessel shell 20 in substantially the reverse order of their removal from atop vessel shell 20.

As stated hereinabove, it is periodically necessary to retrieve radiation detector 120 from annular space 110 to measure the integrated neutron fluence seen by vessel shell 20. However, in order to access detector 120, hole 150 must be unplugged by removing plug 200. To remove plug 200 the CRDMs 90, bolts 60, closure head 50 and upper support structure 160 are removed in the manner previously described. Removal of upper support structure 160 allows slide 510 to upwardly slidably translate due to the upwardly biasing force exerted on proximal end portion 517 by third coiled spring 550. As slide 510 upwardly slidably translates, pegs 540 will also upwardly slidably translate in first groove 240 because pegs 540 are attached to slide 510 and slidably engage first groove 240. However, the upward travel of pegs 540 and thus the upward travel of slide 510 are stopped by upper stop 250.

Next, tool 560 is coaxially aligned with piston 460 and downwardly translated, by means of handle 590, such that wings 580 pass unimpeded through notch 490. After wings 580 pass through notch 490, handle 590 is rotated approximately 90 degrees and upwardly translated such that wings 580 abut or engage the underside of ring member 462. Handle 590 is then further upwardly translated such that wings 580 exert a predetermined upwardly directed force (approximately 200 pounds force) against the underside of ring 462 for upwardly translating piston 460. As piston upwardly translates, proximal end portion 430 of cam 400 will upwardly translate such that proximal end portion 430 disengages cam surface 380. As proximal end portion 430 disengages cam surface 380 it will cause catches 360 to inwardly radially retract into slot 320 as they inwardly pivot about pivot pins 350. Moreover, it will be appreciated from the description hereinabove that as cam 400 is translated upwardly, coiled springs 390/440 are compressed; thus, the upward force exerted on cam 400 by tool 560 should be sufficient to overcome the downwardly biasing forces of coiled springs 390/440 in order to move catches 360 to their unlocked position (as best seen in FIG. 7). Tool 560 is then further upwardly translated to remove plug 200 from hole 150 for allowing access to detector 120.

It will be appreciated that the "as-built" plug 200 may not be perfectly leak-tight due to tolerances and deviations from nominal design dimensions occurring during its manufacture. Thus, during reactor coolant pump transients or surges, a relatively small amount of the coolant may seep into plug 200 because plug 200 may not be leak-tight. Hence, the coolant may enter plug 200 due to the relatively high pressure and velocity of the coolant in vessel shell 20 during such transients. It is therefore important to allow the coolant to escape through plug 200 in order to avoid build-up of internal pressures in plug 200. Build-up of pressure inside plug 200 (i.e., pressurization of plug 200) is undesirable because such pressure build-up may ultimately damage the internal components of plug 200 and compromise the ability of plug 200 to be locked to flange 140. Therefore, a fluid path is provided through plug 200 to allow the coolant to escape through plug 200 and into the space above top surface 147 of flange 140. In this regard, the coolant is allowed to pass through plug 200 along a flow path extending through slot 320, through passageway 410, through bore 310, through channel 330, into first groove 240, between slide 510 and distal end portion 220 of plug body 210, through orifices 480 and then to exit plug 200 through annular ring member 485. Moreover, it should be appreciated from the description hereinabove that the various elements of plug 200 are preferably fabricated from corrosion resistant material, such as "INCONEL 600", "TYPE 304" stainless steel, or the like, so that the elements of plug 200 are not fouled by scaling caused by corrosion. This is important because corrosion of the elements comprising plug 200 may compromise the locking ability of plug 200 by retarding the sliding, pivoting, and translational movements of the elements.

It will be evident from the teachings herein that an advantage of the present invention is that plug 200 resists being inadvertently dislodged from hole 150 due to upset hydraulic forces because plug 200 is capable of being locked to the structure defining hole 150. It will also be evident from the teachings herein that another advantage of the present invention is that the reactor coolant does not substantially flow through the hole to bypass core 70 when plug 200 plugs hole 150.

Although the invention is fully illustrated and described herein, it is not intended that the invention as illustrated and described be limited to the details shown, because various modifications may be obtained with respect to the invention without departing from the spirit of the invention or the scope of equivalents thereof. For example, elastomeric seals may be beneficially located in plug body 210 to preclude coolant from entering plug body 210. This would eliminate the need for providing a fluid flow path through plug body 210.

Therefore, what is provided is a self-locking plug for plugging a hole defined by a surrounding structure, which structure may be a nuclear power reactor pressure vessel core barrel flange.

What is claimed is:

1. A self-locking plug for plugging a hole defined by a surrounding structure, comprising:
    (a) a plug body sized to be disposed in the hole for plugging the hole;
    (b) a locking mechanism pivotally connected to said plug body for locking said plug body to the structure, said locking mechanism including a catch having a hook portion integrally formed therewith for engaging the structure to lock said plug body to the structure;
    (c) a cam slidably connected to said plug body and capable of engaging said locking mechanism for pivoting said catch;
    (d) a piston connected to said cam for driving said cam into engagement with said locking mechanism;
    (e) a ram connected to said plug body for ramming said plug body into the hole to seat said plug body in the hole, whereby said plug body is seated in the hole as said ram rams said plug body into the hole, whereby said cam engages said locking mechanism as said piston drives said cam, whereby said catch pivots as said cam engages said locking mechanism and whereby said plug body is locked to the structure as said catch pivots;
    (f) first biasing means interposed between said catch and said plug body for biasing said catch toward the structure;
    (g) second biasing means interposed between said cam and said plug body for biasing said cam into engagement with said catch; and
    (h) third biasing means interposed between said ram and said plug body for biasing said plug body into the hole.

2. In a nuclear reactor pressure vessel having a core barrel disposed therein, the core barrel having a flange therearound having a bottom surface thereon and a counter-bored access hole therethrough capable of allowing fluid flow through the hole, a self-locking plug for plugging the hole to substantially reduce fluid flow through the hole, the plug comprising:
    (a) a plug body matingly disposed in the hole, said plug body having a longitudinal bore terminating in a transverse slot;
    (b) a locking mechanism connected to said plug body, said locking mechanism including:
        (i) a plurality of spaced-apart parallel pins disposed in the slot and attached to said plug body; and
        (ii) a plurality of catches disposed in the slot, each catch pivotally connected to a respective one of said pins, each catch having a contoured cam surface thereon and a hook portion integrally formed therewith;
    (c) an elongate cam slidably extending through the bore and having an end portion of predetermined contour for matingly engaging the cam surface of each catch;
    (d) a piston connected to said cam for driving said cam into engagement with the cam surface of each catch;
    (e) a ram connected to said plug body for ramming said plug body into the hole to seat said plug body in the hole to substantially reduce fluid flow through the hole whereby said plug body seats in the hole as said ram rams said plug body into the hole, whereby the contoured end portion of said cam matingly engages the contoured cam surface of each catch as said piston drives said cam, whereby each catch pivots in the slot about its respective pin as the end portion of said cam engages the cam surface of each catch, whereby said plug body is locked to the structure as each catch pivots about its respective pin to position the hook portion adjacent the bottom surface of the flange;
    (f) a first coiled spring interposed between said catches for outwardly biasing said catches toward the flange, said first coiled spring having ends thereof connected to respective ones of said catches;

(g) a second coiled spring surrounding said cam and interposed between the end portion of said cam and said plug body for biasing said cam into engagement with said catch; and (h) a third coiled spring surrounding said plug body and interposed between said ram and said plug body for biasing said plug body into the hole.

* * * * *